Jan. 15, 1924. 1,480,627

F. MÜLLER

METHOD OF MAKING HACK SAWS

Filed Dec. 31, 1921

Inventor
Friederich Müller
By Joseph A. Schofield
Attorney

Patented Jan. 15, 1924.

1,480,627

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

METHOD OF MAKING HACK SAWS.

Application filed December 31, 1921. Serial No. 526,120.

*To all whom it may concern:*

Be it known that I, FRIEDERICH MÜLLER, a citizen of the United States, residing at Hartford, in the county of Hartford and State of Connecticut, have invented certain new and useful Improvements in Methods of Making Hack Saws, of which the following is a specification.

This invention relates to a process of hobbing or milling hack-saw blades and relates particularly to a process whereby hack-saw blades may have their teeth formed quickly, accurately and in such a manner that the cutting surfaces are given a sharp and durable cutting edge.

An object of the present invention is to provide a method whereby the tooth outlines of a hack-saw blade may be roughly formed by one milling cutter and thereafter a second milling cutter may be used to dress off a portion of the tooth outline of each of the teeth adjacent the cutting edges. In this way the cutting edges of the teeth are formed by sharp intersections of the two surfaces forming the individual teeth thereby improving the cutting quality of the blade and enabling it to resist wear for a longer period.

Another feature of advantage is that the cutting surfaces are formed in such a manner that one of the surfaces of each of the teeth is first completely formed by one cutter and thereafter the other surface of each of the teeth is formed by the second or finishing cutter.

Another object of the invention is to provide a process enabling a plurality of hack-saw blades to be simultaneously and completely formed in an improved and expeditious manner while mounted in one machine.

In the manufacture of hack-saw blades by a milling operation, the portions of the blades forming the cutting surfaces are necessarily formed by recessed portions of the milling cutters. The apexes of the teeth of the blade forming the cutting surfaces are formed at the base of the recesses in the contour of the milling cutter. For this reason a sharp point on the teeth of the blade is difficult to be obtained and the points formed on the blades are usually somewhat blunt and are apt to become more blunt as the cutters wear and become dull. It is therefore an object of the invention to utilize two cutters operated on parallel arbors in a milling machine, the first of which roughly forms the outline of the teeth of the blade and the second cuts away one side of the teeth to an extent sufficient to form sharply defined points at the intersection of the surfaces on each of the teeth or serrations of the blade.

With these and other objects in view my invention consists in the features of construction and operation set forth in the following specification and illustrated in the accompanying drawing.

In the accompanying drawing annexed hereto and forming a part of this specification, I have shown my invention being carried out in a special form of milling machine but it will be understood that the invention can be otherwise embodied and that the drawing is not to be construed as defining or limiting the scope of the invention, the claims appended to this specification being relied upon for that purpose.

Figure 1:
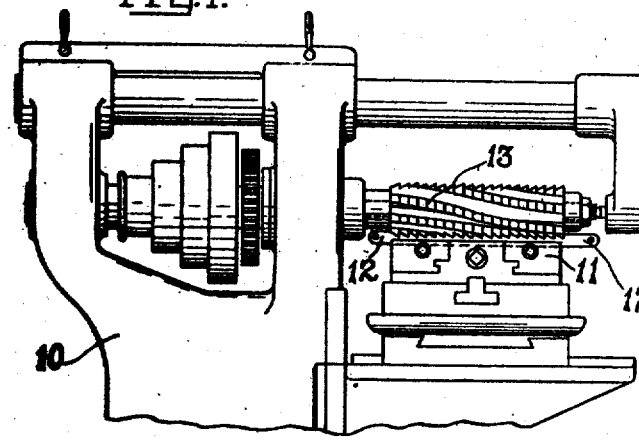
Figure 1 shows a side elevation of a portion of a milling machine with the work being operated on in position.
Figure 2:
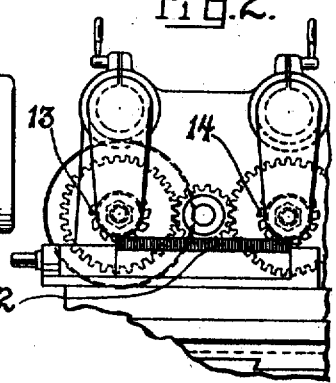
Fig. 2 is a fragmentary front elevation of the machine shown in Fig. 1.
Figure 3:
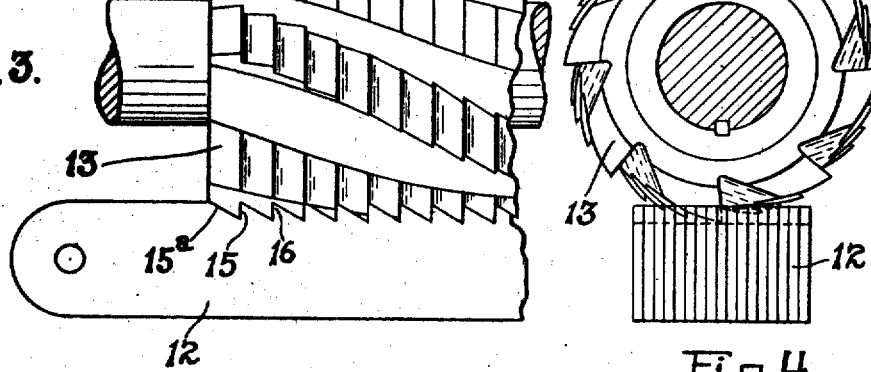
Fig. 3 is a fragmentary view showing one of the cutters in engagement with the work.
Figure 4:
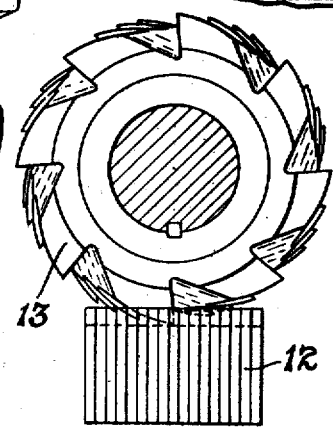
Fig. 4 is an end view of the construction shown in Fig. 3.
Figure 5:
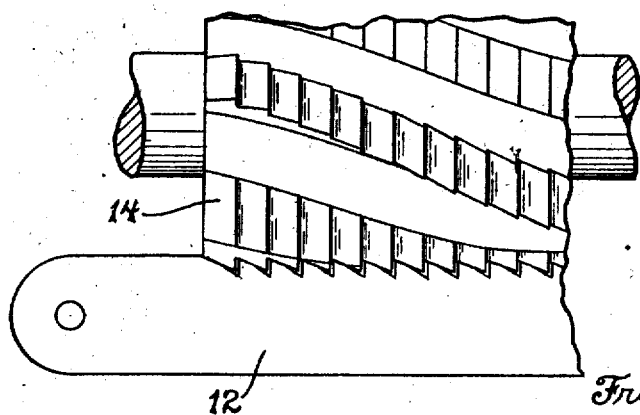
Fig. 5 is a view similar to Fig. 3 showing the second cutter in operation.

In the above mentioned drawing I have shown but one embodiment of the invention which is now deemed preferable but it is to be understood that changes may be made within the spirit of the appended claims without departing from the invention.

Briefly, my invention in its broadest aspect comprises a process involving the following principal steps: first, grouping the hack-saw blades in fixed position upon the work table of a milling machine; second, cutting a plurality of serrations along one edge thereof simultaneously by means of a milling cutter; third, cutting away one of the surfaces of each of the teeth previously formed by a second or supplemental milling cutter.

Referring more in detail to the figures of the drawing, I show one form of milling machine at 10 having a work table 11 upon which a large number of hack-saw blades 12 may be mounted and operated upon by two milling cutters 13 and 14, respectively, mounted to rotate as shown upon parallel axes. In carrying out the present process, the blanks 12 to be formed into hack-saw blades are mounted upon the work table 11 and securely held thereto in position as shown by any desired means and extend in a direction parallel to the axes of the milling machine cutters.

With the blade blanks 12 mounted in position, the table 11 is traversed so that the blades 12 are first moved under and in contact with the first milling cutter 13 which, as shown, cuts away portions 15 along one side and roughly forms the serrations 16 thereon. The milling cutter 13, as shown in the present drawing, comprises a cutter adapted to cut teeth throughout the entire length of the blades 12 simultaneously. The outline or contour of the cutter 13 is such that each part forms one serration or tooth of the hack-saw blade. As shown the form of the milling cutter 13 is such that it cuts both sides of the individual teeth 16. It is impossible, however, to accurately form the tops of the serrations 16 on the blades 12 by this cutter as this part of the blade 12 is formed by the recessed portion between adjacent cutting teeth on the cutter 13, consequently this apex 16 forming an individual cutting edge of the blade 12 is not as accurately and sharply formed as required for developing maximum cutting efficiency.

In order, therefore, to increase the cutting efficiency of the blades 12 and to form the upper parts of the teeth 16 adjacent the cutting edges sharply and expeditiously, I use a supplemental or auxiliary milling cutter 14 to form this apex at a sharply defined predetermined angle. This is accomplished by the milling cutter 14 mounted on a second arbor parallel to and adjacent the arbor on which milling cutter 13 is mounted. The contour of this cutter 14 is such that it cuts away a portion of the sloping side 15$^a$ of each of the teeth 16, thus sharply defining the intersection of the normal or front cutting surface 15 of the tooth 16 with this sloping side 15$^a$.

As a result of the successive action of the two milling cutters, the apexes of the individual teeth which are the parts of the teeth forming the cutting edges of the blades are sharply defined and the blades are rapidly and completely formed while they are mounted in fixed position in a milling machine.

What I claim is:

1. The process of forming hack-saw blades comprising first milling both sides of a plurality of teeth of the blades, and then milling one side of said teeth to form sharply defined cutting edges at the intersection of said sides.

2. The process of forming hack-saw blades comprising first simultaneously milling both sides of each of a plurality of teeth of the blades, and then simultaneously milling one side of each of said teeth to form sharply defined cutting edges at the intersection of said sides.

3. The process of forming hack-saw blades comprisng first simultaneously milling both sides of the teeth of a plurality of blades, and then simultaneously milling one side of the teeth of said blades to form sharply defined cutting edges at the intersection of said sides.

4. The process of forming hack-saw blades comprising first milling both sides of the teeth of a blade, one side of said teeth being normal to the blade and the other oblique, and then milling the oblique side of said teeth to form sharply defined cutting edges at the intersection of said sides.

5. The process of simultaneously forming a plurality of hack-saw blades comprising first milling both sides of the teeth of said blades, one side being normal to the blade and the other oblique, and then milling the oblique sides of each of said teeth to form sharply defined cutting edges at the intersection of said sides.

In testimony whereof, I hereto affix my signature.

FRIEDERICH MÜLLER.